US005616283A

United States Patent [19]

Huege et al.

[11] Patent Number: 5,616,283
[45] Date of Patent: Apr. 1, 1997

[54] HIGH SOLIDS LIME AS A CAUSTIC REPLACEMENT

[75] Inventors: Fred R. Huege, Colleyville; Timothy L. Salter, Fort Worth, both of Tex.

[73] Assignee: Chemical Lime Company, Fort Worth, Tex.

[21] Appl. No.: 519,292

[22] Filed: Aug. 25, 1995

[51] Int. Cl.$^6$ .............................. C09K 3/00; B01J 13/00
[52] U.S. Cl. ..................... 252/192; 252/180; 252/189; 252/313.1; 252/314
[58] Field of Search ................... 252/313.1, 314, 252/180, 189, 192

[56] References Cited

U.S. PATENT DOCUMENTS

| | | | |
|---|---|---|---|
| 1,106,778 | 8/1914 | Campbell | 106/821 |
| 3,842,013 | 10/1974 | Booth | 252/180 X |
| 4,175,975 | 11/1979 | MacWilliams et al. | 106/100 |
| 4,302,207 | 11/1981 | Paspek | 252/192 X |
| 4,427,643 | 1/1984 | Fowler | 423/580 |
| 4,464,353 | 8/1984 | Hains | 423/640 |
| 4,610,801 | 9/1986 | Matthews et al. | 252/181 |
| 4,627,888 | 12/1986 | Engdahl | 162/30.11 |
| 4,717,503 | 1/1988 | Makino et al. | 252/350 |
| 4,762,590 | 8/1988 | Engdahl | 162/30.11 |
| 4,816,182 | 3/1989 | Novich et al. | 252/313.1 |
| 4,849,128 | 7/1989 | Timmons et al. | 252/181 |

FOREIGN PATENT DOCUMENTS 09200104  11/1994  Belgium.

*Primary Examiner*—Richard D. Lovering
*Attorney, Agent, or Firm*—Charles D. Gunter, Jr.; Grady K. Bergen

[57] ABSTRACT

A composition for a pumpable lime slurry which is adapted for use as a replacement for caustic solutions is formed by combining a dispersing agent in lime and water to form an aqueous slurry. The amount of lime used is between 35 to 55% by weight of the slurry. The dispersing agent, which is an anionic polyelectrolyte, such as polyacrylic, polycarboxylic acids and alkali metal salts thereof, is added in the an amount between 0.1 to 3% by weight of the lime. To this is added an alkali metal hydroxide of 0.1 to 1.5% by weight of lime. The order of addition of the alkali metal hydroxide is important. The later addition of the alkali metal hydroxide results in a decreased viscosity so that a lower amount of dispersing agent is required.

42 Claims, 1 Drawing Sheet

HIGH SOLIDS LIME AS A CAUSTIC REPLACEMENT

BACKGROUND OF THE INVENTION

1. Field of the Invention

This invention relates to a composition and method for forming a calcium hydroxide slurry for use as an alkaline neutralizing agent.

2. Description of the Prior Art

Alkaline products which are used in adjusting pH in commercial activities, such as the treatment of sewage or wastewater, typically employ sodium hydroxide solutions (commonly referred to as caustic) or suspensions of magnesium hydroxide. Sodium hydroxide is widely available commercially as typically found in a solution having an activity of approximately 50%. As a true solution, 50% caustic is indefinitely stable and has a relatively low viscosity. Magnesium hydroxide is not a solution but rather a suspension of small particles in water. Magnesium hydroxide, however, is not indefinitely stable without agitation, and the particles eventually settle out of suspension forming a sediment layer.

Both caustic and magnesium hydroxide have inherent disadvantages. A 50% strength caustic solution is very dangerous and can result in serious chemical burns if extensive safety precautions are not followed. Further, magnesium hydroxide reacts much more slowly than sodium hydroxide so that an excess amount of magnesium hydroxide must be typically added to produce adequate reaction rates.

Lime has a relatively rapid reaction rate and is fairly safe to handle, making it preferable to use in place of caustic soda or magnesium hydroxide. Further, lime is less costly than caustic or magnesium hydroxide. It has a relatively stable price which fluctuates much less than the price of caustic. Several disadvantages, however, prevent conventional lime slurries from being used where caustic soda solutions would otherwise be used. Because lime slurries are composed of individual calcium hydroxide particles, these calcium hydroxide particles will tend to settle from suspension. Further, the viscosity of conventional lime slurry is high compared to caustic soda. It is difficult to produce a conventional lime slurry with a solids content of greater than 32% without producing such a high viscosity that the material becomes unmanageable. Typically, a viscosity above approximately 2000 cps can cause handling difficulties. Lime slurry can be made less viscous by the addition of gypsum during slaking. Solids content in excess of 40% can be produced in this way. However, the effect of the gypsum is to agglomerate the lime making an abundance of large calcium hydroxide particles. These large lime particles quickly settle from suspension and form a hard sediment that is hard to remove and causes plugging of pipes. In addition, large lime particles react more slowly and display other detrimental characteristics.

To make a lime slurry with a fine particle size, either hydrated lime ($Ca(OH)_2$) or quicklime ($CaO$) with no gypsum must be used. Hydrated lime requires mixing, powder handling, and dust control equipment that most facilities lack. In addition, neutralizing with hydrated lime is time consuming and can generate a large amount of dust. The other alternative is slaking quicklime without gypsum. This requires slaking equipment and quicklime storage facilities. Slaking is also time and labor intensive and generates oversize "grit" that must be removed and disposed of properly. Hot solutions generated during lime slaking can also pose a burn hazard.

In forming high solids content lime slurries with low viscosities, large amounts of dispersing agents are used with hydrated lime. High amounts of dispersants are undesirable in many applications. For instance, neutralized waste water is commonly treated in an aeration basin. Excess dispersant can cause foam to accumulate on the aerated waste resulting in significant processing difficulties. Also, polymeric dispersants add to the total organic content of material treated which can be undesirable. Further, high dispersant amounts would add considerably to the cost of producing lime slurries for use as a caustic replacement. It is therefore necessary to reduce or minimize the amount of dispersants, especially the polymeric dispersants in formulating a low viscosity of lime slurries for a caustic replacement. As much as 5% dispersant based upon the dry weight of lime has been used in order to make a pumpable slurry having a solids content of lime between 45 to 50%.

It is therefore an object of this invention to produce a fine grain material that can be used as a caustic replacement that does not settle readily from suspension.

It is another object of this invention to provide a caustic replacement which displays a relatively low viscosity at high solids content and that has a substantially identical neutralizing capacity as a solution containing an equivalent amount of caustic.

Further, it is an object of this invention to produce a lime slurry having a high solids content of more than about 39% by weight and a viscosity of less than 2000 cps, and preferably less than 1000 cps.

It is another object of this invention to provide a lime slurry that remains stable for several days without settling into a hard packed sediment that cannot be easily resuspended.

It is yet another object of this invention to provide a lime slurry that is of low viscosity and high solids content with little dispersing agent.

SUMMARY OF THE INVENTION

A method and composition for forming a lime slurry which is adapted to be used as an alkaline neutralizing agent, such as would be suitable for replacement of caustic soda solutions, is accomplished by mixing together lime and a dispersant agent in water to form an aqueous slurry. The amount of lime used is between about 35–55% by weight of the slurry. The lime has a particle size wherein 95% of the lime is finer than about 20 mesh. The dispersing agent is an anionic polyelectrolyte which is used in the amount between 0.1 to 3% by weight of the lime. The lime is used in the amount of between 35 to 55% by weight of the total slurry. Further, an alkali metal hydroxide is added to the slurry after the dispersing agent and lime have been mixed with the water. The alkali metal hydroxide, such as sodium hydroxide, is used in an amount between 0.1 to 1.5% by weight of the lime. The lime slurry formulated in the described manner can be used as a caustic replacement for sodium hydroxide in a generally 1:1 ratio. These and other features, aspects, and advantages of the present invention will become better understood with reference to the following description and appended claims.

DETAILED DESCRIPTION OF THE INVENTION

Figure 1:
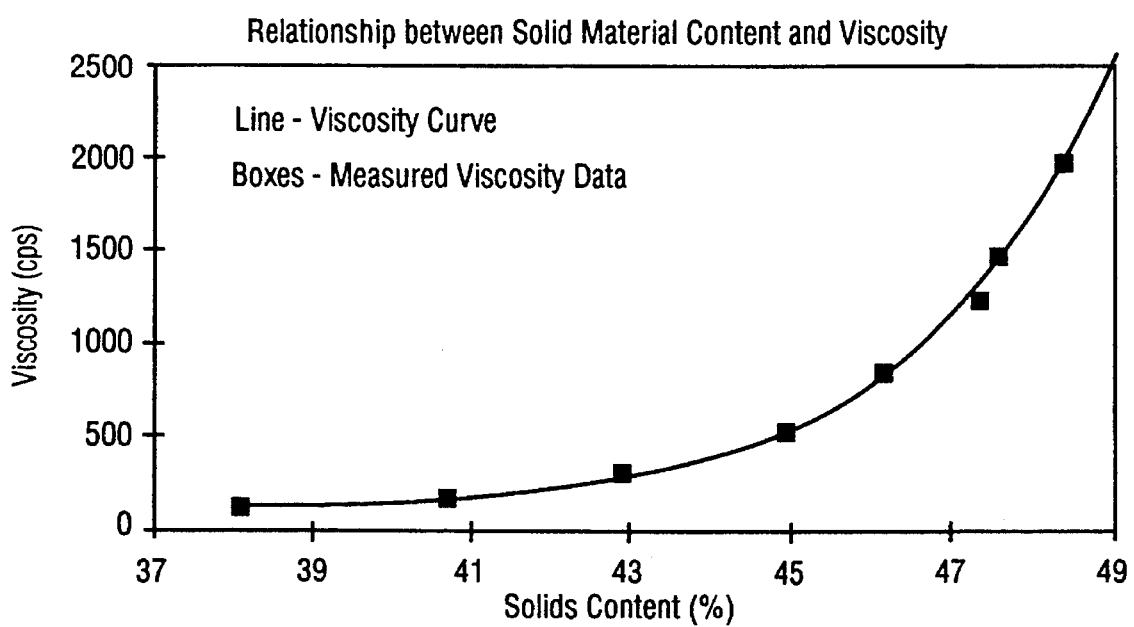
FIG. 1 is a graph showing the relationship of slurry viscosity to the content of lime solids using the formulation and procedures carried out in accordance with the invention.

To produce a stable, high solids lime slurry which can be used as a caustic replacement, it is necessary to provide a low viscosity so that the slurry can be easily pumped. Slurries having a viscosity of less than 2000 cps and preferably less than 1000 cps as measured at 100 RPM on a Brookfield or Labline viscometer are required to be usable as a replacement for caustic solutions. A pumpable lime slurry with high solids content is formulated by first adding a polymer dispersing agent to the initial slurry water and then adding the required amount of lime.

The dispersants used are polymeric electrolyte dispersants, preferably anionic polyelectrolytes. Suitable anionic polyelectrolytes used as dispersing agents include polyacrylic acid, polycarboxylic acid and polyphosphoric, copolymers of polyacrylic acid, polycarboxylic acid and polyphosphoric acid, and the alkali metal salts thereof. Polymethacrylic acid along with the alkali metal salts thereof can also be used. Preferably, the polyacrylic acids and polycarboxylic acids along with their alkali metal salts are used. A commercially available polyacrylate is "DISPEX N40V," available from Allied Colloids. Examples of commercially available polycarboxylate dispersants are "ACUMER 4000," "ACUMER 9000" and "ACUMER 9400," available from Rohm and Haas. The polymeric dispersing agents are preferably used in amount of less than 3% by weight based on the weight of lime. Preferably, between 0.1 to 2% by weight of lime are used, and more preferably 0.5 to 1% of dispersing agent is used based on the dry weight of lime.

The lime used in forming these slurries may be either hydrated lime or quicklime. Hydrated lime is preferable due to its safety and ease of handling. A mixture of quicklime and hydrated lime can also be used. If quicklime is used exclusively, the slurry must be cooled after an initial quicklime addition to produce approximately 40% solid material in the slurry. Addition of quicklime at a solids contents above 37 to 40% by weight of slurry will raise the temperature above the boiling point of water. This eliminates the beneficial effects of the polymer dispersant and thus ruins the slurry. The remainder of the quicklime can be added after the slurry has cooled sufficiently to prevent boiling as the second increment is added. The cooling step can be eliminated if the second lime addition is hydrated lime and not quicklime. The ratio of hydrated lime and quicklime depends on the final solids desired and the necessity of preventing boiling.

It is preferable to have a lime slurry with a very fine particle size. A fine particle size ensures longer suspension of the particles and results in a better reactivity of the lime slurry. Use of a lime slurry having a lime particle size wherein 95% of the particles are of less than 20 mesh. More preferably, lime having a particle size where 95% of the particles are less than 60 mesh is used.

A dispersing aid of an alkali metal hydroxide is used to further lower the viscosity of the slurry without the increased addition of polymer dispersant. It has been found that by adding the dispersing aid of an alkali metal hydroxide after the dispersing agent and lime have already been mixed, the viscosity of the lime slurry can be reduced further. This order of addition has been found to be extremely important. The alkali metal hydroxides of sodium hydroxide, potassium hydroxide and lithium hydroxide have all been found to decrease the viscosity of lime slurry. Sodium hydroxide, however, is preferred as it is readily available. The amount of sodium hydroxide required ranges between about 0.1 to 1.5% by weight of lime. Preferably between 0.3 to 0.8% of sodium hydroxide by weight of lime is used.

In addition to the above, it may sometimes be beneficial to add a suspending agent such as bentonite, synthetic hectorite or a high molecular weight organic suspending agent. Typically, the suspending agents are used in an amount of less than 1% by weight of lime.

The following examples illustrate the effects of varying the order of addition of the dispersing chemicals on the slurry viscosity. The examples were prepared and analyzed in the following method.

1. An initial slurry water (approximately 325 grams) was weighed and placed in a bowl of a Hobart mixer. Approximately 20 ml of water was placed aside in a beaker.

2. The appropriate amount of polymer dispersant was weighed in an aluminum dish and mixed into the slurry water from Step 1.

3. Hydrated lime (typically 325 grams) was added slowly to the water-dispersant mixture in the Hobart mixture.

4. The appropriate amount of solid sodium hydroxide was weighed on an analytical balance and dissolved into the 20 ml of water set aside from Step 1. This sodium hydroxide solution was slowly mixed into the slurry from Step 3 above. The order of addition of polymer dispersant, lime, and sodium hydroxide was varied to determine the effects of the order of addition.

5. The slurry was mixed for five minutes to homogenize the mixture.

6. The slurry was quickly poured into a beaker and the viscosity determined with either a Brookfield or Labline viscometer at 100 rpm.

7. The percentage solids content of the slurry was determined either with a Gardner cup or by oven drying.

8. The remaining slurry was placed back in a beaker mixed with a Steadfast mixer and diluted with a small increment of water. Steps 5–7 were repeated for each increment of water added. Water additions of 10 ml, 15 ml, 20 ml, 25 ml, 30 ml and 40 ml were made during each experimental run. 9. The raw data consisting of measured viscosities (dependant variable) and solids contents (independent variable) was used to generate a smooth curve mathematically relating the two variables. 10. The values given in the examples below are the viscosity at a given solids content derived from the curves developed in Step 9 above.

FIG. 1 shows an example of a curve derived from the data of Example 7 below and used in Step 9 of the experimental procedures described. Curves used to approximate the viscosity for each of the examples are represented by the following equation:

$$\text{Viscosity} = \exp[a + (b/\text{solids}) + (c/\text{solids}^2)]$$

In the equation above, viscosity is in centipoise, solids is in %, and $a$, $b$ and $c$ are regression constants for the equation calculated by a least-squares fit.

EXAMPLES

EXAMPLE 1

Control: This experiment shows the viscosity of hydrated lime slurry with no treatment. The following ingredients were mixed according to the method above and the viscosity of the slurry at 47% solids was obtained from a viscosity vs. solids curve, such as that shown in FIG. 1.

385 g water
325 g Ca(OH)$_2$
Results: Viscosity at 47% solids content: 2824 cps

EXAMPLE 2

A lime slurry was formed using 1% dispersant alone.
365 g water
325 g Ca(OH)$_2$
3.25 g Acumer 9400
Results: Viscosity at 47% solids content: 2066 cps

EXAMPLE 3

A lime slurry was formed using 1% dispersant with 0.2 mole/l of NaOH added last.
325 g water
325 g Ca(OH)$_2$
3.25 g Acumer 9400
2.6 g NaOH added last
Results: Viscosity at 47% solids content: 279 cps

EXAMPLE 4

A lime slurry was formed using 1% dispersant and 0.2 mole/l of NaOH added first.
345 g water
325 g Ca(OH)$_2$
3.25 g Acumer 9400
2.6g NaOH added first
Results: Viscosity at 47% solids content: 768 cps

EXAMPLE 5

A lime slurry was formed using 0.2 mole/l NaOH with no dispersant.
385 g water
325 g Ca(OH)$_2$
2.6 g NaOH added last
Results: Viscosity at 47% solids content: 2874 cps Further examples using the procedures described above were carried out wherein the dispersant was added prior to adding lime and wherein the sodium hydroxide dispersing aide was added last with varying amounts and types of dispersant and dispersing aid. The results are shown below.

EXAMPLE 6

A lime slurry was formed using 1.25% dispersant and 0.3 mole/l NaOH added last.
325 g water
345 g Ca(OH)$_2$
4.31 g Acumer 9400
3.9 g NaOH added last
Results: Viscosity at 47% solids content: 58 cps

EXAMPLE 7

A lime slurry using 0.5% dispersant and 0.1 mole/l NaOH added last was formed.
345 g water
325 g Ca(OH)$_2$
1.625 g Acumer 9400
1.3 g NaOH added last
Results: Viscosity at 47% solids content: 1179 cps

EXAMPLE 8

A lime slurry was formed using 2% dispersant and 0.2 mole/l NaOH added last.
325 g water
325 g Ca(OH)$_2$
6.5 g Dispex N40V
2.6 g NaOH added last
Results: Viscosity at 47% solids content: 70 cps

EXAMPLE 9

A lime slurry was formed using 2% dispersant and 0.4 mole/l NaOH added last.
300 g water
325 g Ca(OH)$_2$
6.5 g Acumer 9400
4.8 g NaOH added last
Results: Viscosity at 47% solids content: 18 cps The use of approximately 47% solid lime slurry is equivalent to approximately 50% of a sodium hydroxide caustic solution. Thus, lime slurries formulated as above generally can be used on a one to one basis by volume as a 50% sodium hydroxide solution. The lime slurry has particular application in industrial, environmental, and corrosion prevention areas. If the slurry must be stored for extended periods of time such that settling of the lime does occur, the solids may be easily resuspended with little agitation and without requiring additional dispersants or dispersing aids.

The invention has several advantages over the prior art. The lime slurry has a fine particle size and a low viscosity so that it is useable in areas that would become plugged or clogged using conventional lime slurries. The lime slurry is safe to handle and reacts rapidly making it an excellent caustic replacement. The lime slurry of the invention is also less expensive than caustic or magnesium hydroxide. There is no hard sediment, and if the lime in the lime slurry settles, it is easily redispersed or suspended. The low amounts of polymer dispersant also reduces the potential for foaming and lessens organic contamination of liquids being treated with the lime slurry.

While the invention is shown in only one of its forms, it should be apparent to those skilled in the art that it is not so limited but is susceptible to various changes without departing from the scope of the invention.

What is claimed is:

1. A method of forming a lime slurry adapted for use as an alkaline neutralizing agent, the method comprising the steps of:

mixing lime and a dispersing agent in water to form an aqueous slurry, the amount of lime being between about 35 to 55% by weight of the slurry and the amount of the dispersing agent being between about 0.1 to 3% by weight of the lime; and then admixing an alkali metal hydroxide to the slurry in an amount between about 0.1 to 1.5% by weight of lime after mixing the lime and dispersing agent.

2. The method of claim 1, wherein:

the dispersing agent is an anionic polyelectrolyte.

3. The method of claim 1, wherein:

the dispersing agent is selected from a group consisting of a polyacrylic acid, polycarboxylic acid and polyphosphoric acid, copolymers of polyacrylic acid, polycarboxylic acid and polyphosphoric acid, and alkali metal salts thereof.

4. The method of claim 1, wherein:

at least 95% of the lime has a particle size finer than about 20 mesh.

5. The method of claim 1, wherein:

at least 95% of the lime has a particle size finer than about 60 mesh.

6. The method of claim 1, wherein:

the amount of dispersing agent is between about 0.1 to 2% by weight of lime.

7. The method of claim 1, wherein:

the amount of dispersing agent is between about 0.1 to 1% by weight of lime.

8. The method of claim 1, wherein:

the amount of alkali metal hydroxide is between about 0.3 to 0.8% by weight of lime.

9. The method of claim 1, wherein:

the lime is supplied by calcium hydroxide.

10. The method of claim 1, wherein:

the lime is supplied by calcium oxide.

11. The method of claim 1, wherein:

the lime is supplied by calcium hydroxide and calcium oxide.

12. The method of claim 1, wherein:

the dispersing agent is mixed with the water prior to mixing with lime.

13. The method of claim 1, wherein:

the alkali metal hydroxide is selected from a group consisting of sodium hydroxide, lithium hydroxide and potassium hydroxide.

14. The method of claim 1, wherein:

the alkali metal hydroxide is sodium hydroxide.

15. The method of claim 1, wherein:

the dispersing agent is added to the water prior to adding the lime.

16. A method of forming a pumpable lime slurry having a viscosity of less than 2000 cps as measured at 100 rpm on a Brookfield Viscometer and adapted for use as an alkaline neutralizing agent, the method comprising the steps of:

mixing lime having a particle size finer than about 20 mesh and an anionic polyelectrolyte dispersing agent in water to form an aqueous slurry, the amount of lime being between about 35 to 55% by weight of the slurry and the amount of the dispersing agent being between about 0.1 to 3% by weight of the lime; and then admixing sodium hydroxide to the slurry in an amount between about 0.1 to 1.5% by weight of lime after mixing the lime and dispersing agent.

17. The method of claim 16, wherein:

at least 95% of the lime has a particle size finer than about 60 mesh.

18. The method of claim 16, wherein:

the amount of anionic polyelectrolyte dispersing agent is between about 0.1 to 2% by weight of lime.

19. The method of claim 16, wherein:

the amount of the anionic polyelectrolyte dispersing agent is between about 0.1 to 1% by weight of lime.

20. The method of claim 16, wherein: the amount of alkali metal hydroxide is between about 0.3 to 0.8% by weight of lime.

21. The method of claim 16, wherein:

the lime is supplied by calcium hydroxide.

22. The method of claim 16, wherein:

the lime is supplied by calcium oxide.

23. The method of claim 16, wherein:

the lime is supplied by calcium hydroxide and calcium oxide.

24. The method of claim 16, wherein:

the dispersing agent is mixed with the water prior to mixing with lime.

25. The method of claim 16, wherein:

the dispersing agent is selected from a group consisting of a polyacrylic acid, polycarboxylic acid and polyphosphoric acid, copolymers of polyacrylic acid, polycarboxylic acid and polyphosphoric acid, and alkali metal salts thereof.

26. The method of claim 16, wherein:

the alkali metal hydroxide is selected from a group consisting of sodium hydroxide, lithium hydroxide and potassium hydroxide.

27. The method of claim 26, wherein:

the alkali metal hydroxide is sodium hydroxide.

28. The method of claim 16, wherein:

the anionic polyelectrolyte is added to the water prior to adding the lime.

29. A lime slurry composition adapted for use as an alkaline neutralizing agent, comprising:

water;

lime in an amount between about 35 to 55% by weight;

a dispersing agent in an amount of between 0.1 to 3% by weight of the lime; and an alkali metal hydroxide in an amount of between about 0.1 to 1.5% by weight of the lime which is added after the lime and dispersing agent have been added to and mixed with the water.

30. The lime slurry of claim 29, wherein:

the dispersing agent is an anionic polyelectrolyte.

31. The lime slurry of claim 29, wherein:

the dispersing agent is selected from a group consisting of a polyacrylic acid, polycarboxylic acid and polyphosphoric acid, copolymers of polyacrylic acid, polycarboxylic acid and polyphosphoric acid, and alkali metal salts thereof.

32. The lime slurry of claim 29 wherein:

at least 95% of the lime has a particle size finer than about 20 mesh.

33. The lime slurry of claim 29, wherein:

at least 95% of the lime has a particle size finer than about 60 mesh.

34. The lime slurry of claim 29, wherein:

the amount of dispersing agent is between about 0.1 to 2% by weight of lime.

35. The lime slurry of claim 29, wherein:

the amount of dispersing agent is between about 0.1 to 1% by weight of lime.

36. The lime slurry of claim 29, wherein:

the amount of alkali metal hydroxide is between about 0.3 to 0.8% by weight of lime.

37. The lime slurry of claim 29, wherein:

the lime is supplied by calcium hydroxide.

38. The lime slurry of claim 29, wherein:

the lime is supplied by calcium oxide.

39. The lime slurry of claim 29, wherein:

the lime is supplied by calcium hydroxide and calcium oxide.

40. The lime slurry of claim 29, wherein:

the dispersing agent is mixed with the water prior to mixing with lime.

41. The lime slurry of claim 29, wherein:

the alkali metal hydroxide is selected from a group consisting of sodium hydroxide, lithium hydroxide and potassium hydroxide.

42. The lime slurry of claim 41, wherein:

the alkali metal hydroxide is sodium hydroxide.

* * * * *